June 30, 1942.    O. J. BRATZ ET AL    2,288,511
AUTOMOBILE LIFT
Filed Feb. 7, 1938
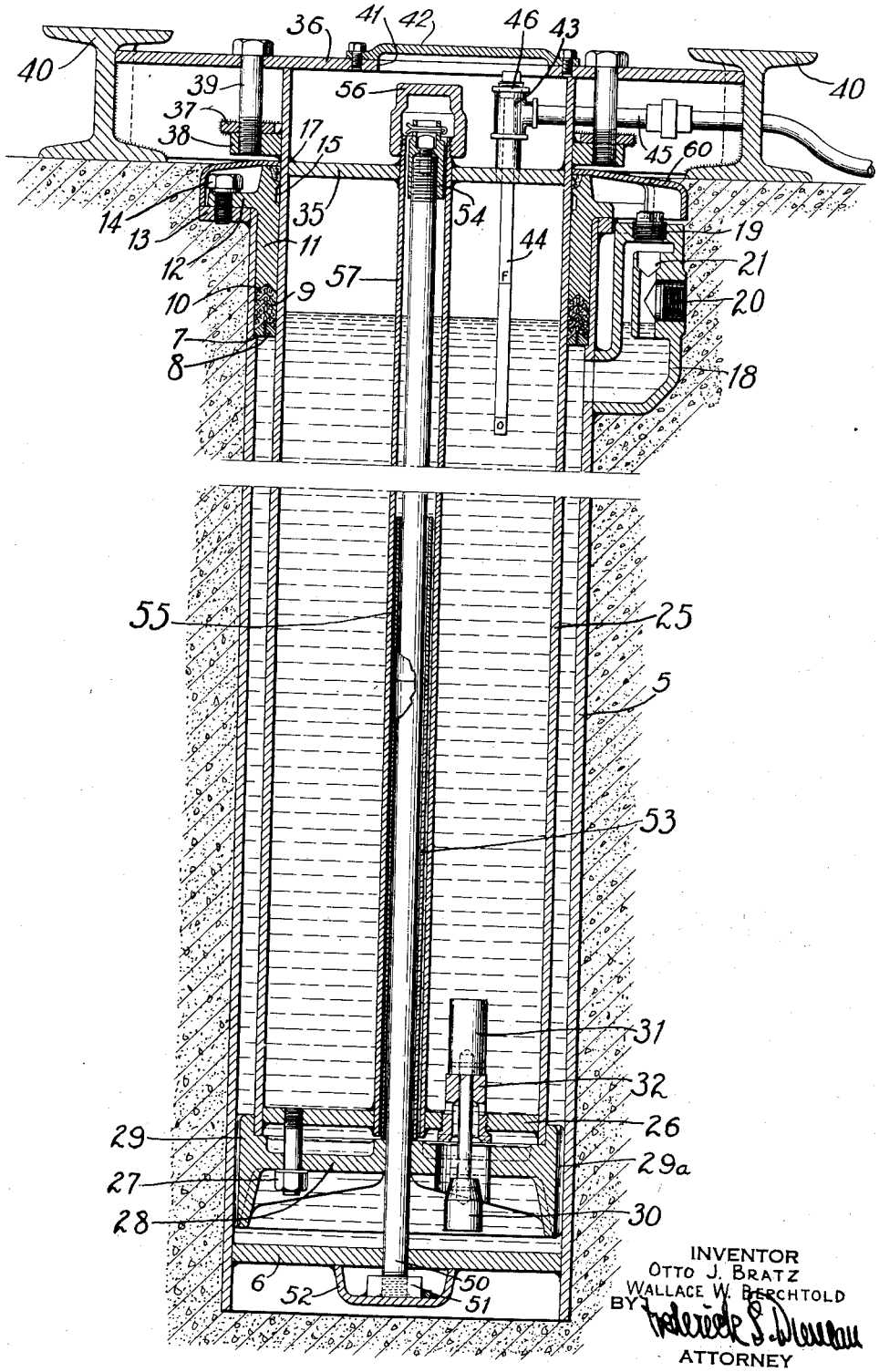
INVENTOR
OTTO J. BRATZ
WALLACE W. BERCHTOLD
BY
ATTORNEY Patented June 30, 1942

2,288,511

UNITED STATES PATENT OFFICE 2,288,511

AUTOMOBILE LIFT

Otto J. Bratz, Adrian, Mich., and Wallace W. Berchtold, York, Pa., assignors to American Chain & Cable Company, Inc., Bridgeport, Conn., a corporation of New York Application February 7, 1938, Serial No. 189,046

2 Claims. (Cl. 121—46)

This invention relates to improvements in lifts and is disclosed in connection with automobile lifts.

In automobile lifts of the general type herein disclosed the upward movement of the ram is limited by the engagement of a flange on the head or bottom end of the ram with the lower end of a relative long bearing cage connected to the upper end of the cylinder. This engagement between the parts tends to loosen the upper bearing member and cause leakage of oil and distorts the cooperating parts so as to affect their operation. It was also necessary with these constructions to locate the packing gland of the upper bearing member upwardly from the lower end of said bearing member and in case adjustment of the gland was desired it was necessary to use a packing ring compression member. In other types of constructions means for stopping the upward movement of the ram was located on the outside of the ram and therefore required extra work in installing the lift as is well understood.

It is, therefore, one object of our invention to provide an improved form of stopping means for a lift of this general type to eliminate the objections above set forth and this may be accomplished by using a stopping means which is axially located with respect to the ram and cylinder and is preferably of such construction that the distance through which the ram may travel may be readily varied. This construction makes it feasible to use a shorter upper bearing member which can be readily removed to gain access to the packing rings and also to facilitate removal of the ram. Self adjusting packing rings may be employed and the usual packing compression ring may be eliminated. It is also feasible to use a lower bearing member on the ram providing together with the upper bearing member widely separated bearing faces. The use of a short upper bearing member also permits locating conversion connections close to the top of the cylinder.

Other objects of this invention relating to these and other features hereinafter described will appear from the following description taken in connetion with the drawing in which the single figure is a vertical central section through the ram, cylinder and platform structure.

The lift comprises a cylinder or casing 5, a piston or ram 25, and a platform member 40. The cylinder is preferably made of heavy seamless steel tubing which is adapted to be set in concrete and braced thereby. The lower end of the cylinder is closed by a cylinder head 6 of heavy steel welded in place against the cylinder wall to form an oil tight seal. At its upper end the cylinder is provided with a packing seat 7 on which is seated a perforated generally V-shaped packing supporting ring 8 cooperating with the lower one of V-shaped nested packing rings 9, the upper one of which is seated in a V-shaped seat 10 in the lower or inner end face of a relatively short bearing ring 11. The upper end of the bearing ring 11 is provided with a flange 12 by means of which it may be secured to a ring 13 welded to the outside wall of the cylinder and flush with the upper end thereof by bolts 14. Near its upper end the bearing ring 11 is provided with a groove 15 into which grease may be injected to form a grease seal with the ram, by a forced feed fitting (not shown), and at its extreme upper end the bearing ring is provided with a groove to receive a wiper ring 17 which prevents grit from entering the packing gland and bearing.

At its upper end the cylinder 5 may be provided with an elbow-shaped conduit member 18 provided with an air venting plug 19 and a plug 20 closing the port through which oil is admitted when the lift is operated directly by oil pressure from a remote oil tank. The port has two branches as shown, one of which is provided with a valve seat 21 into which a ball valve may be dropped to operate as a retard valve during lowering of the lift when the lift is operated wholly by oil.

Operating within the cylinder 5 is the piston or ram 25 with which the bearing ring and parts heretofore described cooperate. The lower end of the ram is closed by a sheet steel disk 26 welded to the walls of the ram to form an oil tight seal. Secured to the disk 26 by bolts 27 (only one of which is shown), is a bearing member 28 comprising a bearing ring 29 which is grooved in its outer face as shown at 29a to permit the oil to flow past the bearing ring to and from the space between the head of the ram and the lower end of the cylinder and the space between the walls of the ram and cylinder. The member 26 is provided with an opening in which operates the head 30 of a gravity operated valve weighted by a member 31 which when the valve is in the open position rests on a thimble-shaped perforated valve seat 32 threaded in the disk 26. This valve is constructed to permit movement of the ram in either direction at a desired maximum rate and to reduce the velocity of downward movement of the lift to about half said rate when the lift is lowered too rapidly or drops because of breakage in the air pressure connection. For this purpose the seat or valve may be grooved (not shown), to permit a restricted flow of oil after the valve has been seated by the upward rush after the maximum lowering rate has been reached.

The upper end of the ram is closed by a disk 35 of heavy steel welded to the wall of the ram to form an air tight seal. The free upper end of the ram bears on the connecting web of a U-shaped member 36 to the legs of which is welded a ring 37 which is seated on a ring 38 welded to the outside wall of the ram. The U-shaped member is secured to the ring 38 by bolts 39. The ends of the U-shaped member are seated against the webs of I-shaped platform members 40, and welded thereto and to ribs on said I-shaped members as indicated. The U-shaped member may be provided with an opening 41 which may be closed by a plate 42 as indicated. This opening is provided for the purpose of providing access to parts hereinafter described.

Mounted in the disk 35 is a connection 43 which carries an oil gage 44 and which is provided with a conduit for connection to an air pressure hose 45 connection and with a plug 46 which may be removed for access to the gage and also to add oil to the piston and cylinder.

When compressed air is admitted into the air chamber between the surface of the oil and the disk 35, the oil contained within the ram is forced down past the gravity valve 30 into the pressure chamber between the lower end of the ram and the cylinder and through the grooves 29a in the bearing ring 29 into the space between the walls of the ram and cylinder against the packing rings 9. If it is desired to operate the lift by oil from an oil reservoir located at a remote point, the oil gage and air connection may be removed, the gravity valve 30 may be removed and a plug inserted in its place. A ball valve may be dropped on the seat 21 after removal of the plug 19 and an oil transfer line may be connected to the member 18 after removal of the plug 20. In this case the oil pressure will operate on the lower end of the ram and will also compress the packing rings 9 to effectively seal the ram and piston.

In constructions of this general type the upward movement of the ram heretofore was limited by engagement of a member such as 29 with the lower end of a bearing ring such as 11. The impact against the upper bearing ring caused the latter to be loosened and also prevented the use of packing rings at the lower end of the upper bearing ring. Moreover the lower member could not be used as a bearing ring because of such impacts.

The mechanism that we employ to limit the upward movement of the ram and lift comprises a rod 50 which extends through an aperture in the disk 6 at the lower end of the cylinder and which is preferably threaded into a nut 51 welded to plate 52 which in turn is welded to the disk 6 to form an oil tight seal. This rod passes through an aperture in the member 28 and a larger aperture in the disk 26 and extends upward through an aperture in the disk 35 as clearly disclosed. Surrounding the rod 50 and seated on the member 28 is a tube 53 of such length that its upper end is spaced from a nut 54 threaded on the upper end of the rod 50 a distance equal to the desired upward travel of the lift. The nut 54 may be locked if desired by a bolt threaded in the upper end of the rod 50 and held against accidental withdrawal by a cotter pin. If it is desired to decrease the travel of the lift, a tube section 55 is dropped on top of the tube 53 after removal of the nut 54 and a cap nut 56 threaded on a concentric tube 57 passing through and welded to the disks 35 and 26 in oil tight seal relation.

This construction of the means for limiting the travel of the lift has the advantage that the members that perform this function may be located centrally and axially of the structure so that any tendency to rock the ram and lift due to variations in engagement at different points of the engaging faces of these members will be reduced to a minimum. The construction also makes it possible to eliminate any contact between the bearing ring on the lower end of the ram and the bearing ring carried in the upper end of the cylinder. It is also possible to locate the packing rings at the lower end of the upper bearing ring where they may be subject to the varying pressures of the oil and therefore effect a tighter seal for higher pressures. The construction also facilitates an adjustment in the travel of the ram which may be effected by removing the cover plate 42 on the U-shaped member of the platform construction, the cap 56 on the tube 57, and the nut 54 on the rod 50 and then dropping a desired length of section 55 over the rod 50 as is obvious. The surface of the bearing ring 29 may be accurately machined and is not subject to impacts with the upper bearing ring on the cylinder as in prior constructions. By locating the elbow 18 close to the upper end of the cylinder, conversion from direct to remote control may be readily effected without tearing up much of the concrete. A cover plate 60 may be provided to cover the outer end of the bearing ring 11 and the wiping ring 17 to protect those parts.

While we have disclosed one form of various features of our invention, it is to be understood that this disclosure is to be taken merely as illustrative and is not to be taken as limitative or restrictive and that we reserve the right to make such changes as fall within the principles of the invention herein disclosed and of the scope of the claims hereto attached.

We claim:

1. The combination in a lift construction of a main cylinder having a lower end wall, a cooperating piston comprising concentrically arranged hollow cylinders and upper and lower end walls connected to said concentric cylinders providing a fluid tight space between said concentric cylinders, the upper end of the inner of said concentric cylinders being connected to the upper end wall of said concentric cylinders in a manner to make its interior accessible from the exterior of the piston, means limiting the upward movement of said piston and comprising concentric members the inner of which is anchored to the lower end wall of the main cylinder and the outer of which is supported by the lower end wall of the piston, said outer member comprising a cylinder of less length than said inner member, and a detachable member on the upper end of said inner member forming an abutment for said outer member as said piston is raised and having a manipulative portion located beyond the upper end of the piston and the inner concentric cylinder.

2. In a lift construction, the combination with a cylinder having its lower end closed, a hollow piston operating within and spaced from the wall of said cylinder and of the same outside diameter throughout its length and having its upper end closed and its lower end provided with a port establishing communication between the space within the piston and the pressure chamber between the end of the piston and the end of the cylinder, a grooved bearing ring carried by the lower end of said piston establishing communication from the space between the walls of the piston and cylinder and the pressure chamber between the end of the piston and the end of the cylinder, means for introducing air pressure into the piston means for introducing liquid pressure into the space between the piston and cylinder whereby said piston may be operated by air pressure, or liquid pressure, and stop means limiting the movement of said piston to prevent contact between said bearing members.

OTTO J. BRATZ.
WALLACE W. BERCHTOLD.